US012680952B2

(12) United States Patent
Chang et al.

(10) Patent No.: US 12,680,952 B2
(45) Date of Patent: Jul. 14, 2026

(54) HUMIDITY BASED BEHAVIOR ADAPTATION

(71) Applicant: Hewlett-Packard Development Company, L.P., Spring, TX (US)

(72) Inventors: Jotham Chang, Singapore (SG); Siew Hong Lam, Singapore (SG); Seng San Koh, Singapore (SG); Wei Lit Teoh, Singapore (SG)

(73) Assignee: Hewlett-Packard Development Company, L.P., Spring, TX (US)

( * ) Notice: Subject to any disclaimer, the term of this patent is extended or adjusted under 35 U.S.C. 154(b) by 301 days.

(21) Appl. No.: 18/385,609

(22) Filed: Oct. 31, 2023

(65) Prior Publication Data

US 2025/0137958 A1 May 1, 2025

(51) Int. Cl.
| | |
|---|---|
| *G01N 21/3554* | (2014.01) |
| *B41J 2/045* | (2006.01) |
| *G01N 27/12* | (2006.01) |
| *G03G 21/20* | (2006.01) |
| *H04N 1/00* | (2006.01) |
| *G01N 21/17* | (2006.01) |
| *G01N 21/3559* | (2014.01) |

(52) U.S. Cl.
CPC ...... *G01N 21/3554* (2013.01); *B41J 2/04566* (2013.01); *G01N 27/121* (2013.01); *G03G 21/203* (2013.01); *H04N 1/00978* (2013.01);
*H04N 1/00992* (2013.01); *G01N 2021/1765* (2013.01); *G01N 21/3559* (2013.01); *G03G 2215/00776* (2013.01)

(58) Field of Classification Search
CPC .. G01N 21/25; G01N 21/3554; G01N 27/121; G01N 21/3559; G01N 2021/1765; G03G 21/20; G03G 21/203; G03G 2215/00776; B41J 2/04566; H04N 1/00992
See application file for complete search history.

(56) References Cited

U.S. PATENT DOCUMENTS

| | | | | |
|---|---|---|---|---|
| 6,198,491 B1 * | 3/2001 | Honda | ............... | G03G 15/2039 347/129 |
| 7,447,450 B2 * | 11/2008 | Takahashi | .......... | G03G 15/5029 399/44 |
| 9,335,732 B2 * | 5/2016 | Nishi | ................... | G03G 21/203 |
| 2003/0020773 A1 * | 1/2003 | Schantz | ................. | B41J 29/393 347/14 |

* cited by examiner

*Primary Examiner* — Benjamin R Schmitt
(74) *Attorney, Agent, or Firm* — Foley & Lardner LLP

(57) ABSTRACT

Image forming devices are described comprising a humidity indicator, a scanner to optically scan the humidity indicator, a processor, and a non-transitory computer readable medium storing computer-executable instructions that when executed by the processor cause the processor to instruct the scanner to initiate an optical scan of the humidity indicator, determine a humidity level based on the optical scan of the humidity indicator, and instruct the image forming device to adapt a behavior characteristic of the image forming device responsive of the humidity level.

7 Claims, 6 Drawing Sheets

102

104

108

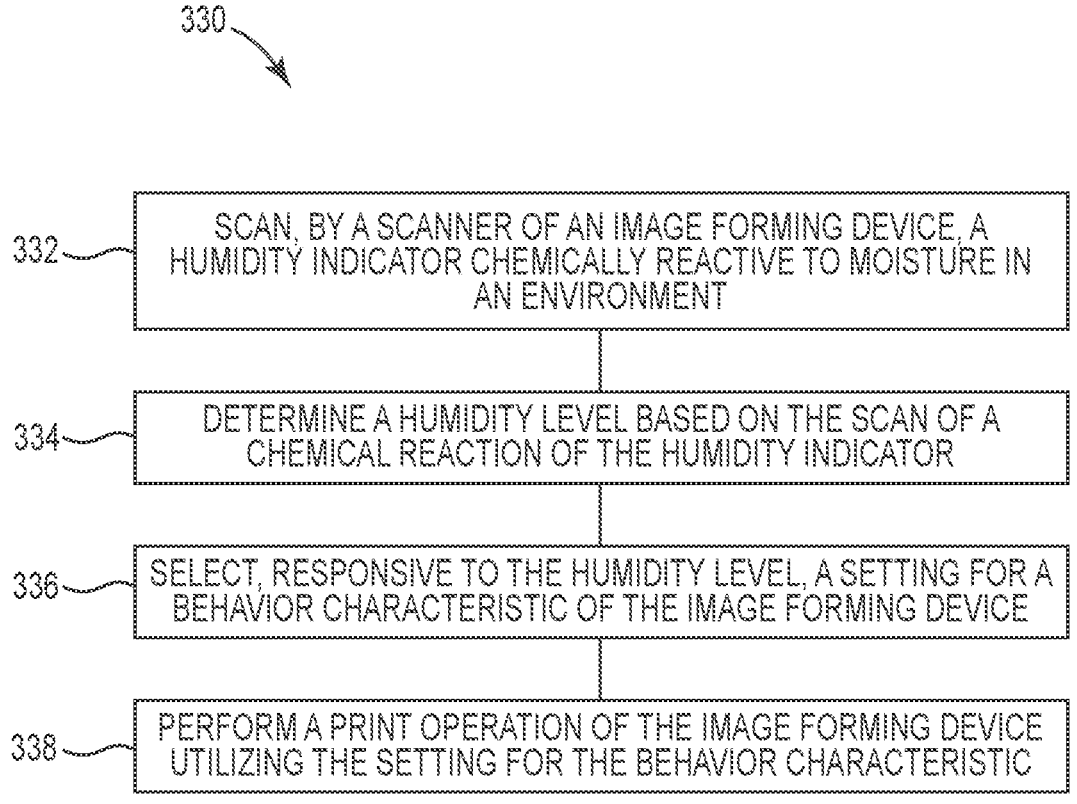

330

332 — SCAN, BY A SCANNER OF AN IMAGE FORMING DEVICE, A HUMIDITY INDICATOR CHEMICALLY REACTIVE TO MOISTURE IN AN ENVIRONMENT

334 — DETERMINE A HUMIDITY LEVEL BASED ON THE SCAN OF A CHEMICAL REACTION OF THE HUMIDITY INDICATOR

336 — SELECT, RESPONSIVE TO THE HUMIDITY LEVEL, A SETTING FOR A BEHAVIOR CHARACTERISTIC OF THE IMAGE FORMING DEVICE

338 — PERFORM A PRINT OPERATION OF THE IMAGE FORMING DEVICE UTILIZING THE SETTING FOR THE BEHAVIOR CHARACTERISTIC

FIG. 3

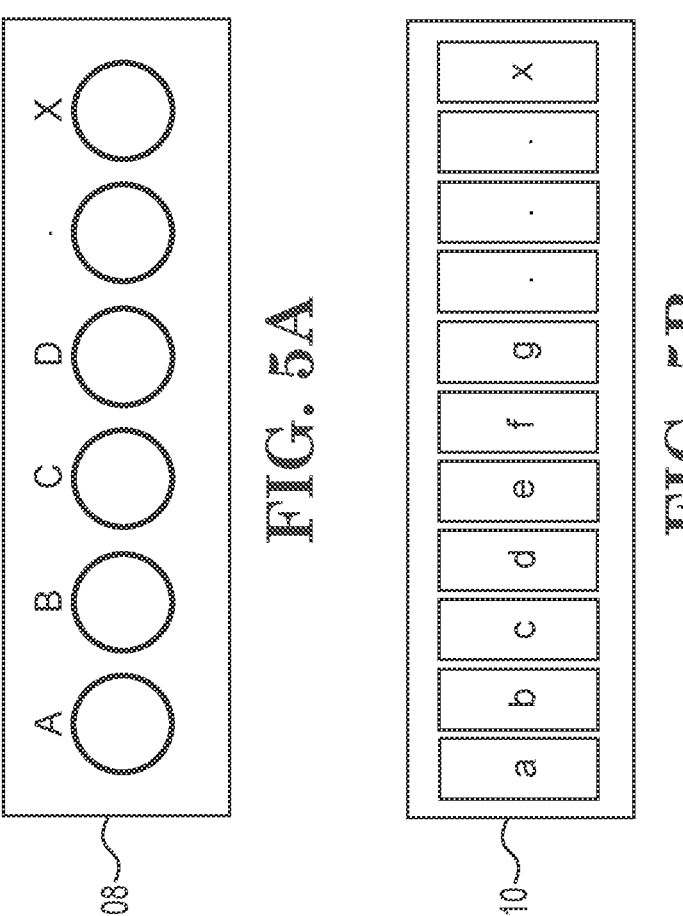
FIG. 5A
FIG. 5B
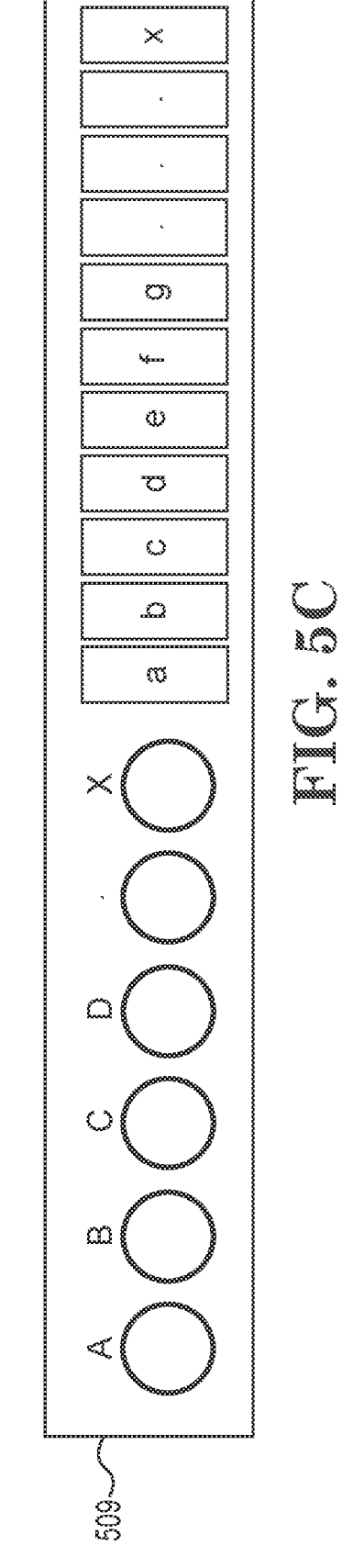
FIG. 5C

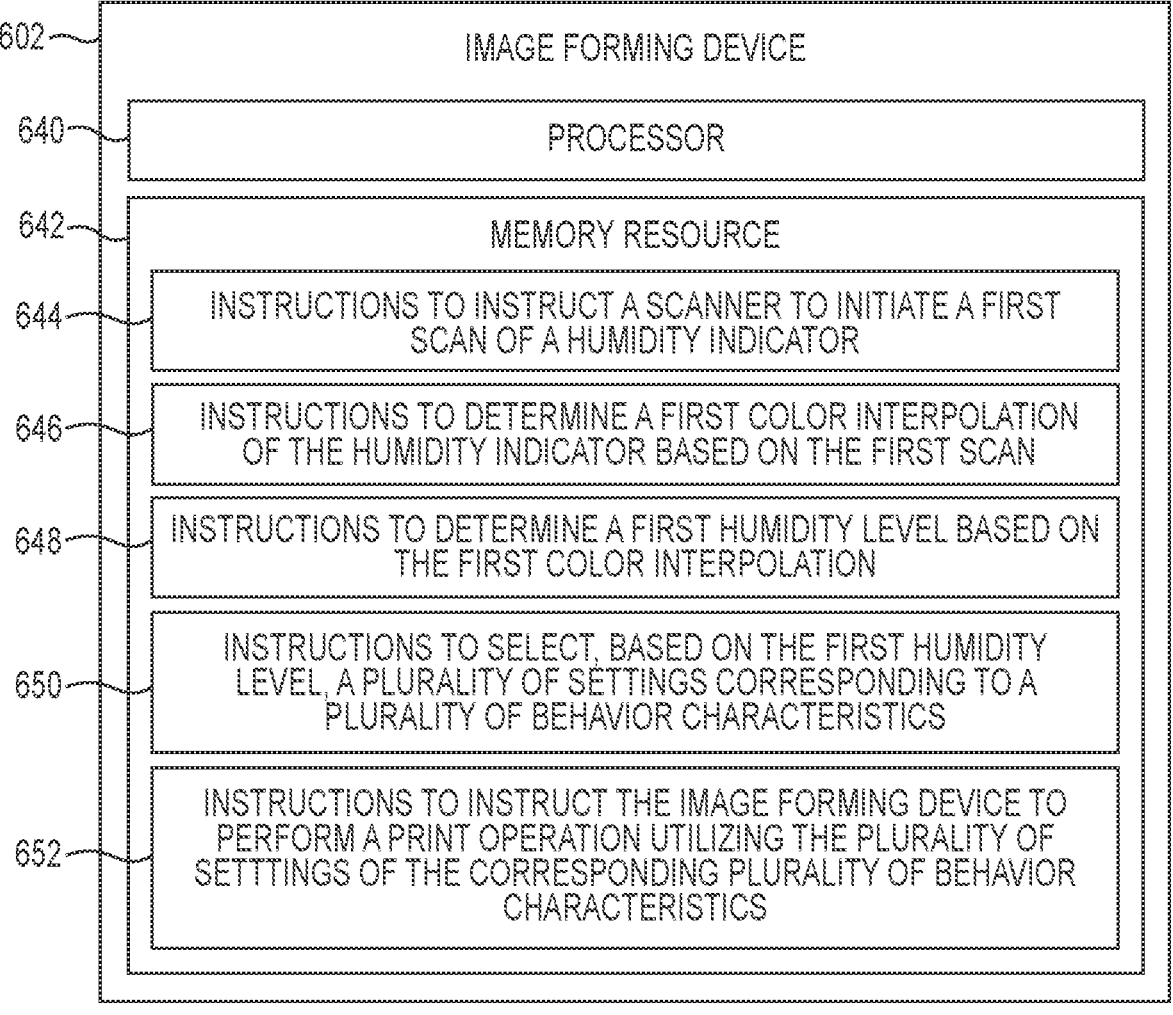

602 — IMAGE FORMING DEVICE

640 — PROCESSOR

642 — MEMORY RESOURCE

644 — INSTRUCTIONS TO INSTRUCT A SCANNER TO INITIATE A FIRST SCAN OF A HUMIDITY INDICATOR

646 — INSTRUCTIONS TO DETERMINE A FIRST COLOR INTERPOLATION OF THE HUMIDITY INDICATOR BASED ON THE FIRST SCAN

648 — INSTRUCTIONS TO DETERMINE A FIRST HUMIDITY LEVEL BASED ON THE FIRST COLOR INTERPOLATION

650 — INSTRUCTIONS TO SELECT, BASED ON THE FIRST HUMIDITY LEVEL, A PLURALITY OF SETTINGS CORRESPONDING TO A PLURALITY OF BEHAVIOR CHARACTERISTICS

652 — INSTRUCTIONS TO INSTRUCT THE IMAGE FORMING DEVICE TO PERFORM A PRINT OPERATION UTILIZING THE PLURALITY OF SETTTINGS OF THE CORRESPONDING PLURALITY OF BEHAVIOR CHARACTERISTICS

FIG. 6

HUMIDITY BASED BEHAVIOR ADAPTATION

BACKGROUND

Image forming devices, such as printers, photocopiers, and plotters, may be used to print on a variety of media, including papers, films, and fabrics. And in some cases, image forming devices may be capable of forming three-dimensional (3D) objects, such as using a build material, a printing fluid, or a combination thereof. In order to enable printing, an image forming device may include a cartridge having a printing substance reservoir. The printing substance reservoir may hold a printing substance, such as a printing fluid for forming markings, for example text and images, on a medium, an agent for solidification of a build material for forming a 3D object, etc. In some cases, the cartridge may be integrated with a printhead having nozzles to dispense the printing substance from the printing substance reservoir.

BRIEF DESCRIPTION OF THE DRAWINGS

FIG. 3 illustrates an example of a method for determining a behavior characteristic of an image forming device based on humidity.

FIG. 5A illustrates an example of a humidity indicator.

FIG. 5B illustrates an example of a temperature indicator.

FIG. 5C illustrates an example of a humidity and temperature indicator.

FIG. 6 illustrates an example of a memory resource for determining a behavior characteristic of an image forming device based on humidity.

DETAILED DESCRIPTION

Figure 1:
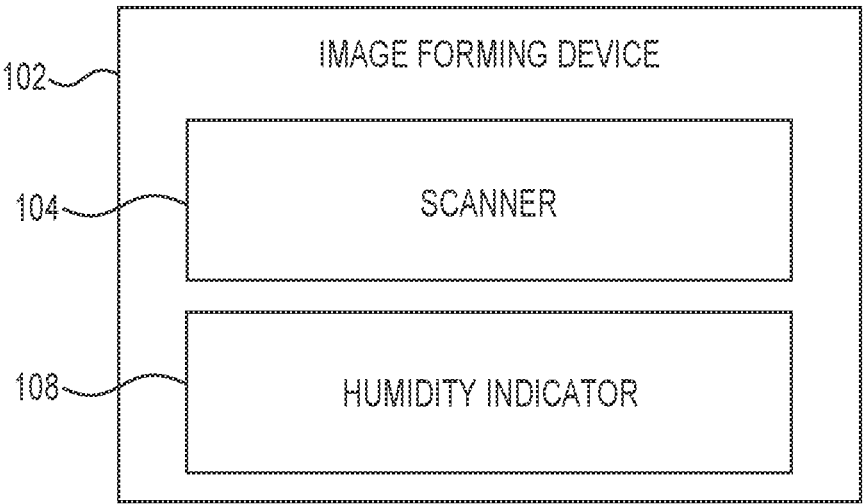
FIG. 1 illustrates an example of an image forming device.

Image forming devices may be used for various purposes, such as for printing, scanning, copying, and/or faxing. In some examples, image forming devices include a scan system with dedicated print media handling systems. For example, some handling systems may be located on top of an image forming device, while others may be within the image forming device or even separate from the image forming device. In some cases, the handling system may include a scan bed.

Example image forming devices may use a marking technology, such as ink jetting or bubble jetting technology, referred to herein as inkjet printing devices, though examples are not so limited. Such image forming devices may include a fluid ejection device comprising a fluid drop jetting printhead that ejects droplets of a printing substance through a plurality of orifices or nozzles toward print media, such as to form objects or images on the print media. A print medium may be a type of suitable sheet or roll material, such as paper, card stock, transparencies, polyester, plywood, foam board, fabric, canvas, photopolymers, plastics, composite, metal, wood, build material for additive printing, print target, and the like. The fluid ejection device may supply a printing substance, such as a printing fluid (e.g., ink), to the printhead from a reservoir that stores the printing substance.

A printing, scanning, copying, and/or faxing of a sheet of print media may be affected by the environment in which the image forming device is located. Printing substances and print media interact with water causing changes in the physical properties of the printing substances and/or print media. As such, the humidity and temperature of the environment in which the image forming device is located can affect a print, scan, copy, and/or fax of the sheet of print media. For example, high humidity in the environment can lead to a loss of stiffness in print media causing print media jams, poor stacking, and/or smears. Low temperatures can reduce the traction of print media transport rollers increasing the potential for print media jams, poor stacking, and/or smears. Low humidity can increase water vapor evaporation causing exposed printing substances (e.g., printing fluid in a container, in a tank, in printing fluid supplies, inside a printhead, etc.) to evaporate, jeopardizing the health of the printhead due to clogging of nozzles and building of residues. Higher temperatures can further increase evaporation.

To minimize the effects of changes in humidity and temperature, behavior characteristics of image forming devices are often set and maintained at an environmental condition worst case scenario. For example, a speed of pick of print media from an input stack of print media and/or a speed of feed of print media through the image forming device may be set at a slower speed than standard to combat issues with print media jams, the speed of feed of print media through the image forming device and/or print media ejection may be set at a slower speed than standard to combat poor stacking and/or smearing of print media, printhead servicing (e.g., spitting, wiping, priming, etc.) may be set at a higher frequency than standard to combat the evaporation of exposed printing substances, by way of non-limiting examples. There may therefore be a desire to detect, estimate, and/or determine a humidity and/or a temperature in which an image forming device is operating.

However, humidity and/or temperature sensors may be costly and thus may be omitted from image forming devices, such as to reduce a device cost. For example, some forms of humidity sensors may include capacitive, resistive, and thermal humidity sensors. For instance, some capacitive humidity sensors operate using a metal oxide strip between electrons and detecting changes in capacitance across the electrons based on changes to the electrical capacity of the metal oxide strip in the environment. Some resistive humidity sensors may rely on ionized salts between electrodes and measuring a change in resistance of the salts in response to humidity. And some thermal sensors may use a dual sensor system in which one thermal sensor is housed in dry nitrogen and the other in ambient air and the difference in temperature corresponds to a humidity level. As would be appreciated, however, such humidity sensors may be costly.

In contrast, the present description proposes the use of a humidity indicator rather than a humidity sensor, as such humidity indicators may be less costly than humidity sensors. Examples of such humidity indicators may include reactive patches (e.g., comprising a cobalt chloride salt), such as on humidity indicator cards, that change color in response to relative humidity (RH) levels in the air. For example, in one implementation, the reactive patch may include a crystalline structure that transitions between different colors (e.g., blue when dry, lavender (transitioning phase), and pink in humidity). In some examples, the reactive patches may be capable of transitioning back and forth, so as to be usable multiple times. The humidity indicator may be optically scanned with a scanner to determine a humidity level of the environment in which the image forming device is located and adapting behavior characteristics (e.g., print media pick speed, print media feed speed, print media ejection characteristic, and printhead servicing frequency, by way of example) of the image forming device in response to the humidity level. Further, in some examples, a temperature indicator may also be optically scanned and the temperature or the humidity level in combination with the temperature of the environment may be utilized in adapting of the behavior characteristics of the image forming device. Adapting of the behavior characteristics based on the humidity level, the temperature, or a combination thereof, as opposed to setting and maintaining the behavior characteristics at a worst case scenario, increases throughput and efficiency of the image forming device and minimizes resources such as operating time and printing substances (utilized in printhead servicing), wear-and-tear on the image forming device, and costs of operating the image forming device.

FIG. 1 illustrates an example of an image forming device 102. It should be understood that the example image forming device 102 in FIG. 1 may include additional features and that some of the features described herein may be removed and/or modified without departing from the scope of the image forming device 102.

Generally speaking, the image forming device 102 may be a printer, a photocopier, a plotter, or the like. The image forming device 102 may include a scanner 104. The scanner 104 refers to a device comprising a light capture element, such as a charge-coupled device (CCD) or a contact image sensor (CIS), capable of receiving light and converting the light into signals that are sent on to a processor. In some cases, this process of capturing and converting light may be referred to as the digitization of an image. The scanner 104 may be part of the image forming device 102 (incorporated into the image forming device 102) or may be connected externally to the image forming device 102 (e.g., hardwired or via wireless connection). For example, some image forming devices 102 may include a scan system with dedicated print media handling systems. Such systems may include a dedicated paper path for scanning functionality and may be referred to as an automatic document feed (ADF) system. The ADF system may be enabled using a scan bar. The scanning system may also include a scan bed and the handling system may move paper in proximity to the scan bed. The scanning system may be internal to the image forming device 102. In addition to (or alternative to) an ADF scanning system, the image forming device 102 may have a door or lid installed over the scan bed for manual scanning. The door or lid may be manually lifted to place a sheet of print media on the scan bed. The sheet of print media may be scanned (e.g., optically scanned) and the door or lid may be lifted again to retrieve the sheet of print media from the scan bed. The scanning system may reside on top of the printing system of the image forming device 102.

The scanner 104 may be utilized for a scan operation and/or a fax operation of the image forming device 102. As used herein, the term "scan operation" may refer to a process of optically capturing markings such as text and/or images, such as may be formed on a medium, and converting the text and/or images to a digital image. As used herein, the term "fax operation" may refer to a process of telephonically transferring scanned text and/or images from one device to another.

The image forming device 102 may include a humidity indicator 108. As used herein, the term "humidity indicator" refers to a substance that is chemically reactive with moisture in an environment, wherein the level of the reaction is based on the level of humidity within the environment in which the substance is located. For instance, as explained above, one example humidity indicator 108 may include a card comprising reactive patches of a crystalline substance. Accordingly, the humidity indicator 108 may detect and display the humidity level responsive to chemically reacting to moisture in the environment. And the scanner 104 may be able to capture an image (including a color, brightness, and hue thereof) of the reactive patches of humidity indicator 108. The humidity indicator 108 may be located in or on the scanner 104 of the image forming device 102 and visible to the scanner 104 during an optical scan operation of the image forming device 102. For instance, the humidity indicator 108 may be hidden under a bezel surrounding a scan bed so as to not be visible to an end user while still being in a scan path of the scanner 104.

In some examples, behavior characteristics of the image forming device 102, such as a print media pick speed, a print media feed speed, a frequency of printhead servicing, a print media ejection characteristic, or a combination thereof, may be adapted based on a humidity of the environment in which the image forming device 102 is located. For example, the image forming device 102 may optically scan the humidity indicator 108. A humidity level of the environment in which the image forming device 102 is located may be determined based on the optical scan of the humidity indicator 108. Responsive to the humidity level, the image forming device 102 may adapt a behavior characteristic.

Figure 2:
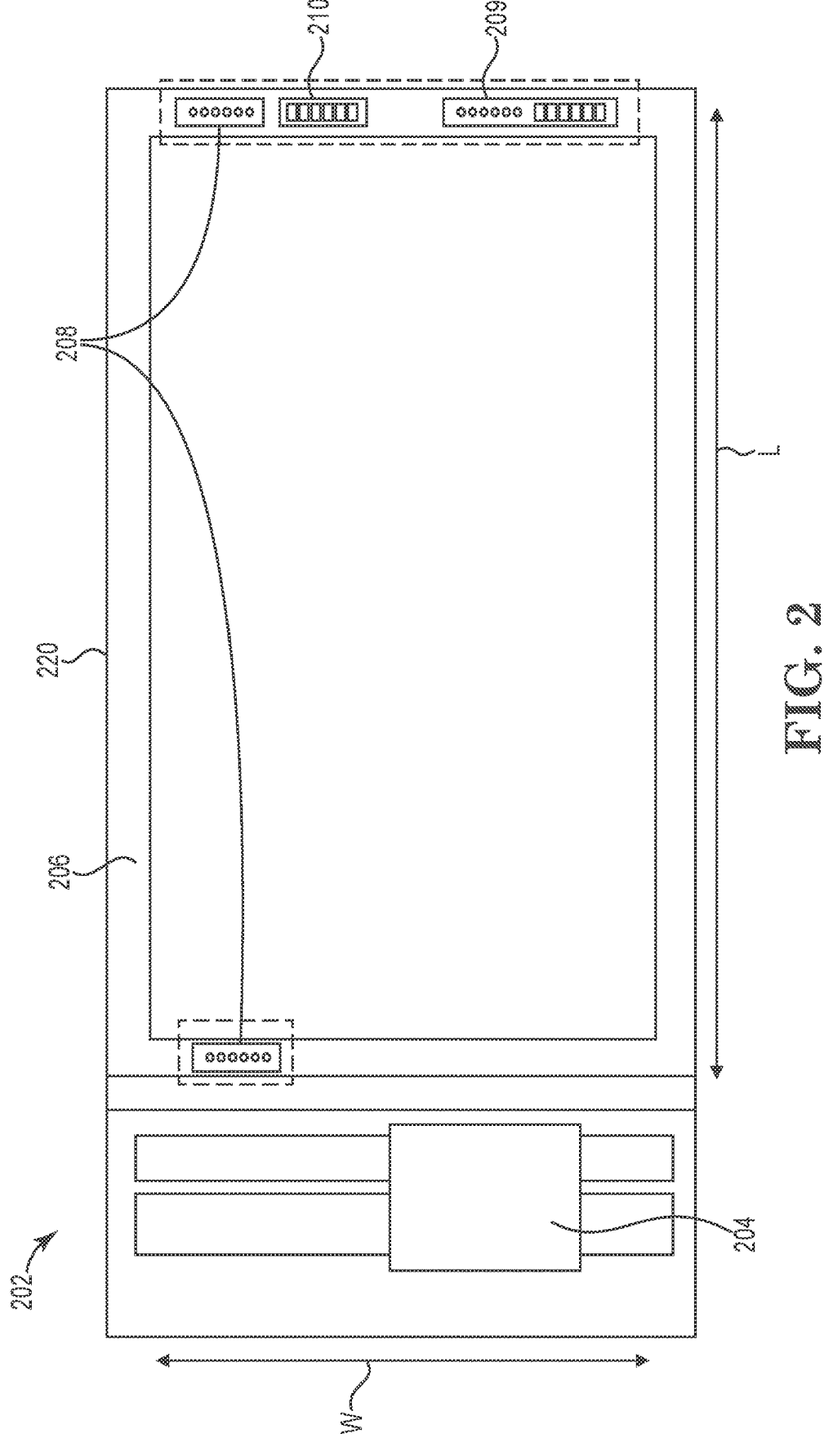
FIG. 2 illustrates an example of a scanner for an image forming device.

FIG. 2 illustrates an example of a scanner 204 for an image forming device 202. In some examples, the image forming device 202 includes the same or similar elements as the image forming device 102 as reference in FIG. 1. For example, the image forming device 202 may include the scanner 204 and a humidity indicator 208.

In some examples, the scanner 204 may include a scan bezel 206. The scan bezel 206 may reside on an outer perimeter of scanning zone 220 of the image forming device 202. During a scan, the scanner 204 may travel a length L of the scanning zone 220 or may travel a particular distance along the length L of the scanning zone 220. For example, the scanner 204 may travel the length of a sheet of print media, or the scanner 204 may travel a predetermined length L of the scanning zone 220 based on a setting of the image forming device 202. Further, during the scan, the scanner 204 may scan a width W of the scanning zone 220. In some examples, the width W of the scan may be perpendicular to the length L of the scan.

The humidity indicator 208 may be located under the scan bezel 206 of the scanner 204 of the image forming device 202 and visual to the scanner 204 during a scan operation of the image forming device 202. FIG. 2 illustrates the humidity indicator 208 located under the scan bezel 206 at a side of the scan bezel 206 closest to the scanner 204 or at a side of the scan bezel 206 farthest from the scanner 204, although examples are not so limited and the humidity indicator 208 may be located at any scannable location under the scan bezel 206.

The image forming device 202 may further include a temperature indicator 210 and/or a combination humidity and temperature indicator 209. As used herein, the term "temperature indicator" refers to a heat sensitive, visual indicator, such as a strip, label, card, etc., that is chemically reactive based on a temperature within the environment in which the heat sensitive, visual indicator is located. For instance, one example temperature indicator 210 may include a strip comprising reactive patches of a crystalline substance. Accordingly, the temperature indicator 210 may detect and display the temperature level responsive to chemically reacting to heat in the environment. And the scanner 204 may be able to capture an image (including a color, brightness, and hue thereof) of the reactive patches of temperature indicator 210.

The temperature indicator 210 and/or the combination humidity and temperature indicator 209 may detect and display a temperature level of the environment in which the image forming device 202 is located. The temperature indicator 210 and/or the combination humidity and temperature indicator 209 may be located under the scan bezel 206 of the scanner 204 of the image forming device 202 and visual to the scanner 204 during an optical scan operation of the image forming device 202. Though FIG. 2 illustrates the temperature indicator 210 and the combination humidity and temperature indicator 209 under the side of the scan bezel 206 farthest from the scanner 204, examples are not so limited and the temperature indicator 210 and/or combination humidity and temperature indicator 209 may be located at any scannable location under the scan bezel 206.

Further, in some cases, the scanning zone 220 may include a scan glass. The scan glass may encompass the entirety of the scanning zone 220. In some examples, the scan glass may be the scanning zone 220. The humidity indicator 208, temperature indicator 210, or combination humidity and temperature indicator 209 may be located under the scan glass. In some cases, the scan glass may include a thinner area to accommodate the humidity indicator 208, temperature indicator 210, or combination humidity and temperature indicator 209. Put another way, the scan glass may be thinner at the location of the humidity indicator 208, temperature indicator 210, or combination humidity and temperature indicator 209.

As illustrated in FIG. 2, while idle, the scanner 204 may be located in a home location. The home location may be adjacent to the scanning zone 220 (or scan glass) of the image forming device 202. The scanner 204 may optically scan the humidity indicator 208, temperature indicator 210, or combination humidity and temperature indicator 209 in the same scan. During the optical scan of the humidity indicator 208, temperature indicator 210, or combination humidity and temperature indicator 209 the travel distance in length L of the scanner 204 may be predetermined and set based on the location and size of the humidity indicator 208, temperature indicator 210, or combination humidity and temperature indicator 209. As such, an amount of time to optically scan the humidity indicator 208, temperature indicator 210, or combination humidity and temperature indicator 209 may be dependent upon the location and/or size of the humidity indicator 208, temperature indicator 210, or combination humidity and temperature indicator 209, in relation to the home location of the scanner 204.

The image forming device 202 may optically scan the humidity indicator 208, temperature indicator 210, or combination humidity and temperature indicator 209 and responsive to a humidity level, temperature level, or a combination thereof determined from the scan, the image forming device 202, as will be described in further detail in reference to FIG. 3 and FIG. 4, may adapt a behavior characteristic of the image forming device 202.

FIG. 3 illustrates an example of a method 330 for determining a behavior characteristic of an image forming device based on humidity. In some examples, the method 330 is executable by a processor. For example, the method 330 includes instructions or elements that are stored on a nontransitory memory resource that are executed by a processor to perform the corresponding functions.

In some examples, the method 330 includes scanning, optically by a scanner of an image forming device, a humidity indicator chemically reactive to moisture in an environment at 332. For example, the humidity indicator may be located under a scan bezel of a scanner (as illustrated in FIG. 2). The humidity indicator may include a minimum of two humidity levels that when exposed to a particular level of moisture chemically react to the moisture. One location on the humidity indicator may react responsive to a low humidity level while a second location on the humidity indicator may react responsive to a high humidity level. However, examples are not so limited and a third, mid-level or multiple mid-levels that react responsive to humidity levels between the low and high levels may be contemplated. A chemical reaction may cause a change in color at the location of the humidity indicator corresponding to the particular level of moisture in the environment.

The image forming device may also include a temperature indicator (as illustrated in FIG. 2). The temperature indicator may be located under the scan bezel of the scanner. As such, the method may further include scanning, optically by the scanner of the image forming device, the temperature indicator. The scanner may scan the temperature indicator during the scan of the humidity indicator. The temperature indicator may include a minimum of two temperature levels that may be heat-sensitive and thus reactive at a particular temperature. One location on the temperature indicator may react responsive to a low temperature level while a second location on the temperature indicator may react responsive to a high temperature level. However, examples are not so limited and a third, mid-level or multiple mid-levels that react responsive to temperature levels between the low and high levels may be contemplated. A heat reaction may cause a change in appearance, such as in color, at the location of the temperature indicator corresponding to the particular level of heat in the environment.

In some examples, the method 330 includes determining a humidity level based on the scan (e.g., optical scan) of a chemical reaction of the humidity indicator at 334. For example, the humidity level may be determined based on a color interpolation of the scanned humidity indicator. Further, in the scenario where the image forming device includes a temperature indicator, the method may further include determining a temperature based on the scan of the temperature indicator. The temperature level may be determined based on a color interpolation of the scanned temperature indicator.

In some examples, the method 330 includes selecting, responsive to the humidity level, a setting for a behavior characteristic of the image forming device at 336. For example, the behavior characteristic of the image forming device may be one of a print media pick speed, a print media feed speed, a frequency of printhead servicing, a print media ejection characteristic, or a combination thereof. The method may further include selecting the setting for the behavior characteristic responsive to or based on the temperature or the humidity level in combination with the temperature.

In some examples, the method 330 includes performing a print operation of the image forming device utilizing the setting for the behavior characteristic at 338. For example, the print operation may be performed in accordance with the selected behavior characteristic, the behavior characteristic being one of a print media pick speed, a print media feed speed, a frequency of printhead servicing, a print media ejection characteristic, or a combination thereof.

In the scenario where the image forming device includes the temperature indicator, the method may further include performing, utilizing the setting for the behavior characteristic determined based on the temperature or the humidity level and the temperature combination, the print operation of the image forming device.

The method may further include rescanning, optically by the scanner of the image forming device, the humidity indicator and determining the humidity level based on the rescan of the chemical reaction of the humidity indicator. For example, a rescan may be initiated during a wake-up mode of the image forming device, prior to performing a print operation, or at a particular amount of time from the scan of the humidity indicator. The method may further include comparing the humidity level based on the scan of the humidity indicator to the humidity level based on the rescan of the humidity indicator and adapting, responsive to a difference in a comparison between the humidity level based on the scan of the humidity indicator and the humidity level based on the rescan of the humidity indicator exceeding a threshold amount, the setting for the behavior characteristic of the image forming device.

For example, minimal changes in the humidity level may have minimal effects on the print operation of the image forming device. Accordingly, adapting the behavior characteristics of the image forming device based on minimal changes to the humidity level may result in multiple minimal changes to behavior characteristics reducing efficiency of the system and potentially increasing wear and tear on the image forming device. As such, a threshold amount of difference between the humidity level determined from a scan and the humidity level determined from the rescan may be determined (e.g., 5% RH, 10% RH, etc.). In some situations, changes, between the scan and rescan, to a chemical reaction at a location on the humidity indicator may exceed the threshold amount.

As such, the method may further include adapting of the setting for the behavior characteristic of the image forming device and performing the print operation of the image forming device utilizing the adapted setting for the behavior characteristic.

Further, rescanning, optically by the scanner of the image forming device, may include rescanning of a temperature indicator and determining the temperature level based on the rescan of the temperature indicator. The temperature level based on the scan of the temperature indicator may be compared to the temperature level based on the rescan of the temperature indicator. As such, adapting the setting for the behavior characteristic of the image forming device may be in response to the difference in the comparison between the humidity level based on the scan of the humidity indicator and the humidity level based on the rescan of the humidity indicator exceeding the threshold amount and/or a difference in a comparison between the temperature level based on the scan of the temperature indicator and the temperature level based on the rescan of the temperature indicator exceeding a threshold amount.

In some examples, the threshold amount of difference between the temperature level determined from the scan and the temperature level determined from the rescan may be determined (e.g., 2°, 5°, etc.) The changes between the scan and rescan at a location on the humidity indicator can, in some instances, exceed the threshold amount. As such, the method may further include adapting of the setting for the behavior characteristic of the image forming device based on a change in the humidity level and/or temperature level and performing the print operation of the image forming device utilizing the adapted setting for the behavior characteristic.

Figure 4:
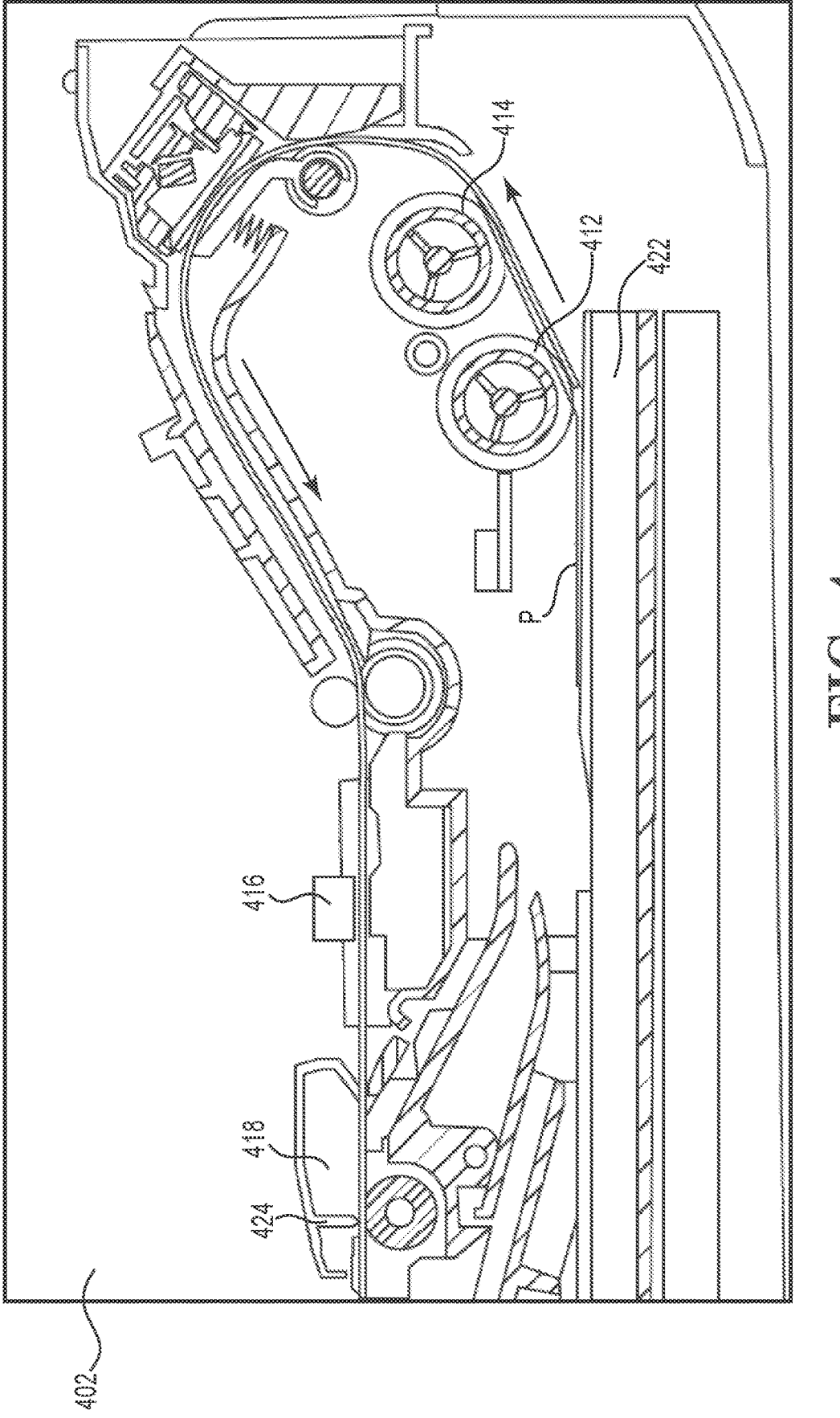
FIG. 4 illustrates an example of an image forming device.

FIG. 4 illustrates an example of an image forming device 402. In some examples, the image forming device 402 includes the same or similar elements as the image forming device 102 as reference in FIG. 1. For example, the image forming device 402 may include a scanner and a humidity indicator (not illustrated in FIG. 4).

As illustrated in FIG. 4, the image forming device 402 may further include a print media pick device 412 utilized to pick print media P from an input tray 422 of the image forming device 402. The print media P may be in a print media stack and may be picked one sheet at a time from the input tray 422 in response to a request for a print operation, a scan operation, and/or a fax operation. For example, the print media pick device 412 may include a pick roller or rollers to pick print media P from the input tray 422, though examples are not so limited. A speed at which the print media P is picked by the print media pick device 412 (e.g., by the pick roller) may be a behavior characteristic of the image forming device 402. As used herein, the term "print operation" may refer to a process of forming markings such as text and/or images by transferring a print material or substance to a medium.

The image forming device 402 may further include a print media feed device 414. The print media feed device 414 may be utilized to feed print media P, picked from the input tray by the print media pick device 412, through the image forming device 402 in order for the image forming device 402 to perform the print, scan, or fax operation on the sheet print media P. The print media feed device 414 may include a feed roller or rollers, though examples are not so limited. A speed at which the print media P is fed through the image forming device 402 by the print media feed device 414 (e.g., by the feed roller) may be a behavior characteristic of the image forming device 402.

Further, the print media feed device 414 may be located between the print media pick device 412 and a printhead 416 of the image forming device 402. In some examples, the image forming device 402 may include the scanner internal to the image forming device 402 and located between the print media pick device 412 and the printhead 416. The print media feed device 414 may be utilized to feed print media P through the internal scanner. A speed at which the print media P is fed through the internal scanner may be a behavior characteristic of the image forming device 402.

The image forming device 402 may include the printhead 416. The printhead 416 may eject drops of printing substance (e.g., a printing fluid) through a plurality of orifices or nozzles toward the sheet of print media P so as to print onto the sheet of print media P during the print operation. Over time, moisture within the printing substance may partially evaporate causing clogging of the orifices or nozzles and building of residues within the printhead system. As such, servicing of the printhead 416 (e.g., spitting, wiping, priming, etc.) may be utilized to purge or clean the printhead system. A frequency at which the printhead 416 is serviced may be a behavior characteristic of the image forming device 402. Further, it is contemplated that a speed in which the printhead 416 travels during the print operation may be a behavior characteristic of the image forming device 402.

The image forming device 402 may further include a print media ejection device 418. The print media ejection device 418 may be utilized to eject print media P out of the image forming device 402. For example, the print media ejection device 418 may include an ejection roller or rollers, though examples are not so limited. In some situations, printing substance deposited onto the print media P may not be fully dry when the print media P reaches the print media ejection device 418 of the image forming device 402. Ejecting of the print media P out of the image forming device 402 prior to a sufficient drying of the printing substance may result in deformity of the print media P (e.g., curling or buckling of the print media P), increased friction between sheets of print media P, and/or smearing of a printed image between sheets of print media P stacked at an output of the image forming device 402. As such, the print media ejection device 418 may pause feeding of the print media P out of the image forming device 402. Accordingly, a pause time of the print media ejection device 418 may be a print media ejection characteristic. This print media ejection characteristic may be a behavior characteristic of the image forming device 402.

Further, during a duplexing print operation, the print media ejection device 418 may feed the print media P back into the device in order to complete print operation on a second side of the print media P. The speed at which the print media ejection device 418 ejects and/or feeds in the print media P (e.g., using the ejection roller) may be adjusted based on a drying time of the printing substance deposited on the print media P. Accordingly, the speed at which the print media ejection device 418 ejects and/or feeds in the print media P may be a print media ejection characteristic. This print media ejection characteristic may be a behavior characteristic of the image forming device 402.

In some examples, the print media ejection device 418 may include a finisher 424. The finisher 424 may perform operations on the sheet of print media P such as hole punching, stapling, binding, embossing, gluing, coating, varnishing, foil stamping, texturing, lamination, creasing, stacking, splicing, rewinding, aligning, folding, cutting, and/or outputting of the sheet of print media P. Feeding of sheets of print media P into a finishing process prior to a sufficient drying of the printing substance deposited on the print media P during the print operation may result in uneven alignment of the print media P caused by deformities in the sheet(s) of print media P and/or friction between the sheets of print media P and may cause smearing of the printed image between sheets of print media P stacked at the finisher 424.

As an example, the print media ejection device 418 may include a cutter device utilized to cut the sheet of print media P, as in a use of a plotter device. In the example of a plotter device, the print media P may be a continuous sheet of print media P. The image forming device 402 may include a roll of the continuous sheet media P or the roll may be exterior to the image forming device 402 and may be fed into the image forming device 402. The image forming device 402 may perform the print operation on the print media P and a cutter of the finisher 424 may cut the print media P with the performed print operation off of the continuous roll of print media P. Cutting and ejecting of the print media P prior to a sufficient drying of the printing substance deposited on the print media P during the print operation may result in deformity of the print media P and/or smearing of the printed image. Accordingly, the print media ejection device 418 may pause or adjust the speed of the feed of the print media P into the finisher 424, may delay the finishing process (e.g., cutting), and/or may delay an ejection of the print media P out of the image forming device 402. Accordingly, a pause time and/or delay time of the print media ejection device 418 may be a print media ejection characteristic. These print media ejection characteristics may be a behavior characteristic of the image forming device 402.

Accordingly, print media ejection characteristics of the print media ejection device 418 such as print media ejection speed, print media ejection delay, print media P pause or speed adjustment, and/or print media finisher process timing may be a behavior characteristic of the image forming device 402, though examples are not so limited and other operations of the print media ejection device 418 may be contemplated.

As previously described, the image forming device 402 may include a humidity indicator such as the humidity indicator 208 as referenced in FIG. 2. Behavior characteristics of the image forming device 402 may be adapted based on a humidity level in which the image forming device 402 is located.

For example, the image forming device 402 may include a processor and a memory (as illustrated in FIG. 6) including instructions that cause the processor to instruct the scanner to initiate a scan of the humidity indicator. The processor may determine a humidity level of the environment in which the image forming device 402 is located based on the scan of the humidity indicator. Further, the memory may include instructions that cause the processor to instruct the image forming device 402 to adapt a behavior characteristic of the image forming device 402 responsive to the humidity level. For example, the behavior characteristics of the image forming device 402 adapted responsive to the humidity level detected by the humidity indicator may be one of a frequency of a printhead 416 servicing, a print media pick device 412 speed, a print media feed device 414 speed, a print media ejection device 418 characteristic, or a combination thereof.

In some examples, the memory may include instructions that cause the processor to instruct the scanner to initiate the scan of the humidity indicator during a wake-up mode of the image forming device 402. As such, scanning of the humidity indicator may be part of or incorporated into the wake-up mode of the image forming device 402. In some examples, the memory may include instructions that cause the processor to instruct the scanner to initiate the scan of the humidity indicator prior to performing the print operation of the image forming device 402. Accordingly, the behavior characteristics may be adapted based on the humidity of the environment during the wake-up of the image forming device 402 and/or prior to performing the print operation.

Further, the memory may include instructions that cause the processor to instruct the image forming device 402 to initiate the scan of the humidity indicator based on an amount of time since a previous scan. For example, the image forming device 402 may scan the humidity indicator prior to a beginning of each print operation or prior to a print operation based on a threshold amount of time since a previous scan of the humidity indicator. For example, scanning of the humidity indicator may occur once an hour, every other hour, etc., and/or may be based on activity (e.g., frequency of use) of the image forming device 402, though examples are not so limited. Further, an initiation of a scan or the frequency of scanning may be dependent on a time of day (e.g., hours of the day in which the humidity is typically high or low). Further, in the case of a large print operation (e.g., printing of multiple pages) or several print operations in a row, the memory may include instructions that cause the processor to instruct the image forming device 402 to pause the print operation, initiate the scan of the humidity indicator, and adapt a behavior characteristic of the image forming device 402.

For example, the processor may compare a first scan of the humidity indicator to a second scan of the humidity indicator. Responsive to a change in the humidity level, the memory may include instructions that cause the processor to instruct the image forming device 402 to adapt the behavior characteristic of the image forming device 402.

Further, as previously mentioned, in some examples, the image forming device 402 may include a temperature indicator. During the scan of the humidity indicator, the image forming device 402 may also scan the temperature indicator. In such examples, the processor may determine a temperature of the environment of the image forming device 402 based on the scan of the temperature indicator. Further, the memory may include instructions that cause the processor to instruct the image forming device 402 to adapt behavior characteristics of the image forming device 402 responsive of the detected temperature or the combination of the detected humidity level and temperature.

For example, during a print operation, components of the image forming device 402 may react differently based on the humidity level in which the image forming device 402 is located. Further, a temperature level in which the image forming device 402 is located may further affect components of the image forming device 402 during the print operation.

As an example, a dry environment or low humidity level (e.g., 10%-20% RH) may dry out the print media P affecting the stiffness of the print media P. The low humidity level may also dry out the print media pick device 412 roller, the print media feed device 414 roller, and/or the print media ejection device 418 roller causing a reduction in traction of the print media pick device 412 roller, the print media feed device 414 roller, and/or the print media ejection device 418 roller. A low temperature level (e.g., 5° C.) may further affect the stiffness of the print media P and the traction of the print media pick device 412 roller, the print media feed device 414 roller, and/or the print media ejection device 418 roller. Reduction in traction may result in the roller(s) slipping on the print media P causing print media P to overlap during the print operation and/or causing the print media P to jam. Further, slipping of the roller(s) on the print media P may cause smearing of a printing substance already applied to the print media P or markings on the print media P from the roller(s). In cases where the image forming device 402 includes an internal scanner, slipping of the roller(s) on the print media P may affect print media P advancement through the internal scanner affecting the scan quality of the print media P. Further, in some examples, the low humidity level may further affect transfer of the print media P from the printhead 416 to a print media stack causing non-uniformed stacking for a finishing process and/or of output print media P.

In some situations, the low humidity may also cause a high build-up of electrostatic charge due to a triboelectric interaction between the print media P and the roller(s). A high amount of electrostatic charge may affect how the print media P interacts with any or all of the roller(s), an internal scanner, and/or another sheet of print media P. For example, print media P may cling to the roller(s), the internal scanner, and/or another sheet of print media P due to the electrostatic charge causing print media P transfer issues such as jams, poor scanning quality, etc. Further, high electrostatic charges, in some cases, can negatively affect circuitry of the image forming device 402.

Accordingly, based on the low humidity level, a behavior characteristic of the image forming device 402 may be adapted. For example, behavior characteristics such as, the speed at which print media P is picked from the input tray 422, the speed at which print media P is fed through the image forming device 402, and/or the speed at which the print media ejection device 418 ejects and/or feeds the print media P into the finishing process or back into the image forming device 402 for a duplexing process, may be adapted (e.g., reduced). Further, in the case where the image forming device 402 includes the temperature indicator, these behavior characteristics may be further adapted (e.g., further reduction in speed) responsive of a low temperature level.

Such adaptations to the behavior characteristics can reduce print operation errors such as print media P overlap, print media P jams, poor internal scanning quality, smearing, non-uniformed finisher and output print media stacking, electrostatic charge build-up, etc. However, in the case where the humidity level increases and/or the temperature level increases, print media P stiffness may reduce and roller traction(s) may increase. Accordingly, monitoring the humidity level, the temperature level, or humidity level in combination with the temperature level and adapting behavior characteristics of the image forming device 402, such as increasing the speed at which print media P is picked from the input tray 422, the speed at which print media P is fed through the image forming device 402, and/or the speed at which the print media ejection device 418 ejects and/or feeds the print media P into the finishing process or back into the image forming device 402 for a duplexing process may increase throughput and efficiency of the image forming device 402 without jeopardizing print quality and operations.

Further, in some situations, a wet environment or high humidity level (e.g., 80%-90% RH) may increase the moisture content of the print media P reducing print media P stiffness. Further, a drying time for printing substances applied to the print media P may increase. As such, potential for deformity of the print media P may increase causing issues with feeding of the print media P during duplexing print operations and/or finishing processes, non-uniform stacking of output print media P, and/or smearing of a printed image between sheets of print media P.

Accordingly, based on the high humidity level, a behavior characteristic of the image forming device 402 may be adapted. For example, behavior characteristics such as, the pause time of the print media ejection device 418 for feeding print media P out of the image forming device 402, feeding print media P to the finishing process, and/or feeding duplexing print media P back into the image forming device 402 may be adapted (e.g., longer pause time). Further, the delay time in a finishing process such as cutting of the print media P from a print media roll by the print media ejection device 418, and/or the speed at which the print media ejection device 418 ejects out and/or feeds the print media P, may be adapted (e.g., longer delay time or reduced roller speed). Further, in the case where the image forming device 402 includes the temperature indicator, these behavior characteristics may be further adapted responsive of the temperature level. For example, a low temperature level (e.g., 5° C.) may increase print media P stiffness but may also increase printing substance dry time, whereas a high temperature level (e.g., 45° C.) may reduce printing substance dry time but may also reduce print media P stiffness.

In the case where the humidity level decreases and/or the temperature level changes print media P stiffness and/or printing substance dry time may change. Accordingly, monitoring the humidity level, temperature level, or humidity level in combination with the temperature level and adapting behavior characteristics of the image forming device 402, such as decreasing the print media ejection device 418 pause time, decreasing the delay time in associated with a finisher process, and/or increasing the print media ejection device 418 roller speed may increase throughput and efficiency without jeopardizing print quality.

Further, in the event of a low humidity level (e.g., 10%-20% RH) and a high temperature level (e.g., 45° C.) water evaporation of exposed printing substances (e.g., printing fluid in a container, in a tank, in printing fluid supplies, inside a printhead, etc.) may increase. An increase in water evaporation may result in an increase in clogging of nozzles and building of residues. As such, based on the low humidity level and the high temperature level, a characteristic of the image forming device 402 may be adapted. For example, the frequency in which the printhead 416 is serviced may be adapted (e.g., increased).

As the humidity level increases and/or the temperature level decreases evaporation may decrease. Accordingly, monitoring the humidity level or humidity level in combination with the temperature level and adapting behavior characteristics of the image forming device 402, such as reducing the frequency of servicing of the printhead 416, can minimize resources, such as time and printing substance materials, and wear and tear on the printhead system without jeopardizing print quality or printhead 416 health.

Accordingly, behavior characteristics on the image forming device 402 may be adapted based on the humidity level, the temperature level, or the humidity level in combination with the temperature level of the environment in which the image forming device 402 is located. Though examples herein state a low humidity level of 10%-20% RH, a high humidity level of 80%-90% RH, a low temperature level of 5° C., and a high temperature level of 45° C., examples are not so limited and various humidity levels and/or temperature levels may be utilized in setting behavior characteristics of the image forming device 402.

FIG. 5A illustrates an example humidity indicator 508. The humidity indicator 508 may be utilized in an image forming device. In some examples, the humidity indicator 508 may detect and display a humidity level of an environment in which the image forming device is located. The humidity indicator 508 may include a chemical or crystalline structure that changes color responsive to the introduction to moisture. For example, the humidity indicator 508 may include chloride salts such as cobalt chloride or copper chloride or may include other chemicals that when introduced to moisture a chemical reaction may result. As such, the humidity indicator 508 may detect and display the humidity level responsive to chemically reacting to moisture in the environment.

The humidity indicator 508 may include a minimum of two humidity levels. For example, the humidity indicator 508 may be a card or strip of material that includes the moisture reactive chemical or may be impregnated with the moisture reactive chemical. Different quantities of the chemical may be placed in different locations of the humidity indicator 508. As such, different levels of moisture in the environment may affect each location of the humidity indicator 508 differently. For example, location "A" may include a low amount of the chemical and thus a chemical reaction to a low amount of moisture in the environment may be displayed. The chemical reaction may be displayed by a change in color of the chemical (e.g., blue to pink in a cobalt chloride chemical, brown to azure in a copper chloride chemical, etc.). As such, location "A" may indicate a low humidity level. Further, location "X" may include a high amount of the chemical and thus a low amount of moisture in the environment may not result in a chemical reaction of location "X." Accordingly, a chemical reaction at location "X," changing the color of location "X" may indicate a high humidity level.

As illustrated in FIG. 5A, the humidity indicator 508 may include multiple chemical locations and thus multiple levels. Each chemical location may include a differing amount of chemical and thus a different humidity level may be experienced in order to cause a chemical reaction resulting in a change of color at the location. For example, location "A" may correspond to a 10% RH, location "B" may correspond to a 20% RH, location "C" may correspond to a 30% RH, location "D" may correspond to a 40% RH, and location "X" may correspond to an x % RH (e.g., an RH greater than 40%). In this example, each location from "A" to "X" includes an increasing amount of chemical. Though an increase in humidity by 10% is described, differing amounts may be contemplated (e.g., 5%, 10%, 60%, etc.).

In this example, in the scenario where the humidity level of the environment is 30%, locations "A," "B," and "C" may have a chemical reaction to the moisture in the environment and may change color (e.g., pink in a cobalt chloride chemical, azure in a copper chloride chemical, etc.) where locations "D" and higher may remain an original color (e.g., blue in a cobalt chloride chemical, brown in a copper chloride chemical, etc.). As such, the humidity indicator 508, responsive to chemically reacting to moisture in the environment may detect and display the humidity level of the environment in which the image forming device is located.

During an optical scan of the humidity indicator 508, the image forming device may determine the humidity level based on a color interpolation of the humidity indicator 508. For example, the image forming device may include a processor and a memory (as illustrated in FIG. 6) including instructions that cause the processor to instruct the scanner to initiate a scan of the humidity indicator 508, perform a color interpolation to detect chemically reacted locations of the humidity indicator 508 (e.g., locations "A," "B," and "C" in the example above), and determine the humidity level based on the color interpolation of the humidity indicator 508.

Further, the humidity indicator 508 may be reusable. For example, if the humidity level of the environment drops from the 30% RH to 20% RH, the humidity indicator 508 may begin to "dry out." As such, location "C" indicating the 30% RH level may dry enough to turn back to the original color (e.g., blue in a cobalt chloride chemical, brown in a copper chloride chemical, etc.). In this scenario, locations "A" and "B" may have a chemical reaction to the moisture in the environment and may change color (e.g., pink in a cobalt chloride chemical, azure in a copper chloride chemical, etc.) where locations "C," "D," and higher may be the original color (e.g., blue in a cobalt chloride chemical, brown in a copper chloride chemical, etc.).

In some examples, the memory may include instructions that cause the processor to instruct the scanner to initiate a second scan of the humidity indicator 508, perform a second color interpolation of the second scan to detect chemically reacted locations of the humidity indicator 508 (e.g., locations "A" and "B" in the example above), and determine the humidity level based on the color interpolation of the humidity indicator 508. As such, during the second scan of the humidity indicator 508, the image forming device may determine a change in the humidity level based on a comparison between the first and second color interpolation of the humidity indicator 508.

FIG. 5B illustrates an example temperature indicator 510. The example temperature indicator 510 may be utilized in an image forming device. In some examples, the temperature indicator 510 may detect and display a temperature level of an environment in which the image forming device is located. The temperature indicator 510 may include a temperature-sensitive chemical that changes color responsive to heat. For example, the temperature indicator 510 may include fusible materials which include crystalline solids sealed under transparent windows that when heated to a specific temperature, changes to a liquid, changing the appearance of the temperature indicator 510, though examples are not so limited and other types of temperature-sensitive indicators may be contemplated. As such, the temperature indicator 510 may detect and display the temperature level responsive to chemically reacting to heat in the environment.

The temperature indicator 510 may include a minimum of two temperature levels. For example, the temperature indicator 510 may be a card or strip of material that includes the temperature-sensitive chemical. Different quantities of the chemical and/or different compositions of the chemical may be placed in different locations of the temperature indicator 510. As such, different levels of heat in the environment may affect each location of the temperature indicator 510 differently. For example, location "a" may include a particular amount or mixture of crystalline solids that when exposed to a low temperature may change from a solid to a liquid, changing the appearance at location "a." The change of appearance may be displayed by a change in color at location "a." As such, location "a" may indicate exposure to a low temperature level. Further, location "x" may include a particular amount or mixture of crystalline solids that when exposed to a high temperature may change from a solid to a liquid, changing the appearance at location "x." Thus, a low temperature may not result in a reaction at location "x," and as such, location "x" may not exhibit a change in appearance (e.g., the solid changing to a liquid) when exposed to a low temperature. However, a reaction at location "x", changing the appearance (e.g., color) of location "x" may indicate exposure to a high temperature level.

As illustrated in FIG. 5B, the temperature indicator 510 may include multiple temperature-sensitive locations and thus multiple temperature levels. As stated above, each location may include differing quantities and/or different compositions of the chemical and thus a different temperature level may be experienced in order to cause a reaction resulting in a change of appearance at the location. As an example, location "a" may correspond to a 5° C. temperature, location "b" may correspond to a 10° C. temperature, location "c" may correspond to a 15° C. temperature, location "d" may correspond to a 20° C. temperature, location "e" may correspond to a 25° C. temperature, and location "x" may correspond to a x° temperature (e.g., a temperature greater than 25° C.). In this example, each location from "a" to "x" includes a differing quantity and/or different composition of the chemical. Though a starting temperature of 5° C. and an increase in temperature by 5° C. at each location is described, differing temperature levels may be contemplated (e.g., 25° C., 27° C., 29° C., . . . 45° C., etc.).

In this example, in the scenario where the temperature level of the environment is 15° C., the mixture of crystalline solids at locations "a," "b," and "c" may change from a solid to a liquid, changing the appearance at the locations, where locations "d" and higher may remain in an original appearance. As such, the temperature indicator 510, responsive to heat in the environment may detect and display the temperature level of the environment in which the image forming device is located.

During an optical scan of the temperature indicator 510, the image forming device may determine the temperature level based on a color interpolation of the temperature indicator 510. For example, the image forming device may include a processor and a memory (as illustrated in FIG. 6) including instructions that cause the processor to instruct the scanner to initiate a scan of the temperature indicator 510, perform a color interpolation to detect heat reacted locations of the temperature indicator 510 (e.g., locations "a," "b," and "c" in the example above), and determine the temperature level based on the color interpolation of the temperature indicator 510.

Further, the temperature indicator 510 may be reusable (e.g., reversable). For example, if the temperature level of the environment drops from the 15° C. to 10° C., mixture of crystalline solids at location "c" may change from a liquid back to a solid, changing the appearance at location "c" back to the original appearance. In this scenario, locations "a" and "b" may have a reaction to the temperature of the environment and may be changed in appearance where locations "c," "d," and higher may have the original appearance.

In some examples, the memory may include instructions that cause the processor to instruct the scanner to initiate a second scan of the temperature indicator 510, perform a second color interpolation of the second scan to detect heat reacted locations of the temperature indicator 510 (e.g., locations "a" and "b" in the example above), and determine the temperature level based on the color interpolation of the temperature indicator 510. As such, during the second scan of the temperature indicator 510, the image forming device may determine a change in the temperature level based on a comparison between the first and second color interpolation of the temperature indicator 510.

FIG. 5C illustrates an example humidity and temperature indicator 509. The humidity and temperature indicator 509 may be utilized in an image forming device. In some examples, the humidity and temperature indicator 509 may detect and display a humidity level and a temperature level of an environment in which the image forming device is located. The humidity and temperature indicator 509 may include the same or similar features and chemicals as the humidity indicator 508 as referenced in FIG. 5A and the temperature indicator 510 as referenced in FIG. 5B.

In some examples, the humidity and temperature indicator 509 may include a minimum of two humidity levels and a minimum of two temperature levels. Further, the humidity and temperature indicator 509 may be a card, a label, or a strip of material and may include the same or similar attributes as described as referenced in FIG. 5A and FIG. 5B.

FIG. 6 illustrates an example of a memory resource 642 for determining a behavior characteristic of an image forming device 602 based on humidity. In some examples, the memory resource 642 may be part of the image forming device 602 or a controller that may be communicatively coupled to the image forming device 602. For example, the memory resource 642 may be part of the image forming device 102 as referenced in FIG. 1, 202 as referenced in FIG. 2, and 402 as referenced in FIG. 4. The memory resource 642 may be communicatively coupled to a processor 640 that executes instructions 644, 646, 648, 650, 652, stored on the memory resource 642. For example, the memory resource 642 may be communicatively coupled to the processor 640 through a communication path. In some examples, a communication path may include a wired or wireless connection that allows communication between devices and/or components within a single device.

The memory resource 642 may be electronic, magnetic, optical, or other physical storage device that stores executable instructions. Thus, a non-transitory machine-readable medium (MRM) (e.g., a memory resource 642) may be, for example, a non-transitory MRM comprising Random-Access Memory (RAM), read-only memory (ROM), an Electrically-Erasable Programmable ROM (EEPROM), a storage drive, an optical disc, and the like. The non-transitory machine-readable medium (e.g., a memory resource 642) may be disposed within a controller and/or computing device. In this example, the executable instructions 644, 646, 648, 650, 652, can be "installed" on the device. Additionally, and/or alternatively, the non-transitory machine-readable medium (e.g., a memory resource 642) can be a portable, external, or remote storage medium, for example, that allows a computing system to download the instructions 644, 646, 648, 650, 652, from the portable/external/remote storage medium. In this situation, the executable instructions may be part of an "installation package." As described herein, the non-transitory machine-readable medium (e.g., a memory resource 642) can be encoded with executable instructions for establishing transfer locations.

In some examples, the memory resource 642 includes instructions 644 to instruct a scanner to initiate a first scan of a humidity indicator chemically reactive to moisture in an environment. The first scan may be an optical scan of the humidity indicator. The humidity indicator may include multiple humidity levels (at multiple locations, respectively) that when exposed to a particular level of moisture chemically react to the moisture. Each location on the humidity indicator may react responsive to differing levels of humidity. A chemical reaction may cause a change in color at the location of the humidity indicator corresponding to the particular level of moisture in the environment.

The memory resource 642 may include instructions to cause the processor to instruct the scanner to initiate the first scan of the humidity indicator during a wake-up mode of the image forming device 602. Further, the memory resource 642 may include instructions to cause the processor to instruct the scanner to initiate the first scan prior to performing a print operation of the image forming device 602.

The image forming device 602 may also include a temperature indicator. As such, the scanner may scan the temperature indicator during the first scan of the humidity indicator. The temperature indicator may include multiple temperature levels (at multiple locations, respectively) that when exposed to a particular amount of heat react to the heat. Each location on the temperature indicator may react responsive to differing levels of heat encountered in an environment. A heat reaction may cause a change in appearance, such as in color, at the location of the temperature indicator corresponding to the particular level of heat in the environment.

In some examples, the memory resource 642 includes instructions 646 to determine a first color interpolation of the humidity indicator based on the first scan. Further, in the scenario where the image forming device 602 includes a temperature indicator, the memory resource 642 may include instructions to determine a first color interpolation of the temperature indicator based on the first scan.

In some examples, the memory resource 642 includes instructions 648 to determine a first humidity level based on the first color interpolation of the humidity indicator. Further, in the scenario where the image forming device 602 includes a temperature indicator, the memory resource 642 may include instructions to determine a first temperature level based on the first color interpolation of the scanned temperature indicator.

In some examples, the memory resource 642 includes instructions 650 to select, based on the first humidity level, a plurality of settings corresponding to a plurality of behavior characteristics of the image forming device 602. For example, the plurality of behavior characteristics of the image forming device 602 may include a print media pick speed, a print media feed speed, a frequency of printhead servicing, and a print media ejection characteristic. The memory resource 642 may include instructions to select the plurality of settings corresponding to the plurality of behavior characteristics of the image forming device 602, based on the first temperature level or a combination of the first humidity level and the first temperature level.

In some examples, the memory resource 642 includes instructions 652 to instruct the image forming device 602 to perform a print operation of the image forming device 602 utilizing the plurality of settings for the corresponding plurality of behavior characteristics. For example, the print operation may be performed in accordance with the selected plurality of behavior characteristics, the plurality of behavior characteristics being a print media pick speed, a print media feed speed, a frequency of printhead servicing, and a print media ejection characteristic.

In the scenario where the image forming device 602 includes the temperature indicator, the memory resource 642 may include instructions to perform the print operation utilizing the plurality of settings for the plurality of behavior characteristics determined based on the temperature level or the humidity level and the temperature combination, of the image forming device 602.

In some examples, the memory resource 642 may further include instructions to instruct the scanner to initiate a second scan of the humidity indicator, or in the scenario where the image forming device 602 includes the temperature indicator, a second scan of the humidity indicator and the temperature indicator. The second scan may be an optical scan of the humidity indicator or the combination humidity indicator and temperature indicator. The memory resource 642 may include instructions to cause the processor to instruct the scanner to initiate the second scan of the humidity indicator prior to performing the print operation of the image forming device 602, during a wake-up mode of the image forming device 602, based on an amount of time since a previous scan (e.g., a threshold amount of time since a previous scan such as once an hour, every other hour, etc.), or based on activity (e.g., frequency of use) of the image forming device 602, though examples are not so limited.

The instructions may further include determining a second color interpolation of the humidity indicator based on the second scan, or in the scenario where the image forming device 602 includes the temperature indicator, determining a second color interpolation of the humidity indicator and a second color interpolation of the temperature indicator based on the second scan.

In this example, the memory resource 642 may further include instructions to determine a second humidity level based on the second color interpolation of the humidity indicator or determine a second humidity level and a second temperature level based on the second color interpolation of the humidity indicator and the second color interpolation of the temperature indicator, respectively. The instructions may further include comparing the first humidity level to the second humidity level. Further, the instructions may include comparing the first temperature level to the second temperature level.

In this example, the memory resource 642 may further include instructions to adapt, responsive to a difference between the first humidity level and the second humidity level exceeding a threshold amount, a setting of the plurality of settings corresponding to a behavior characteristic of the plurality of behavior characteristics of the image forming device 602. For example, one of the plurality of behavior characteristics, the print media pick speed, the print media feed speed, the frequency of printhead servicing, the print media ejection characteristic, or a combination thereof, may be adapted based on a change in humidity level.

In the scenario where the image forming device 602 includes the temperature indicator, the memory resource 642 may further include instructions to adapt a setting of the plurality of settings corresponding to a behavior characteristic of the plurality of behavior characteristics of the image forming device 602 responsive to a difference between the first temperature level and the second temperature level exceeding a threshold amount or responsive to a difference between the first temperature level and the second temperature level and the first humidity level and the second humidity level exceeding a threshold amount.

In this example, the memory resource 642 may further include instructions to instruct the image forming device 602 to perform the print operation of the image forming device 602 utilizing the adapted setting for the behavior characteristic. In some examples, one of the plurality of behavior characteristics, the print media pick speed, the print media feed speed, the frequency of printhead servicing, the print media ejection characteristic, or a combination there of, may be adapted based on the change in humidity level. In the scenario where the image forming device 602 includes the temperature indicator, one of, or a combination thereof, the plurality of behavior characteristics may be adapted based on the change in temperature level or based on the change in a combination of the humidity level and the temperature level.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. Further, as used herein, "a" refers to one such thing or more than one such thing.

The figures herein follow a numbering convention in which the first digit corresponds to the drawing figure number and the remaining digits identify an element or component in the drawing. For example, reference numeral 102 may refer to element 102 in FIG. 1 and an analogous element may be identified by reference numeral 302 in FIG. 3. Elements shown in the various figures herein can be added, exchanged, and/or eliminated to provide additional examples of the disclosure. In addition, the proportion and the relative scale of the elements provided in the figures are intended to illustrate the examples of the disclosure and should not be taken in a limiting sense.

It can be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

The above specification, examples, and data provide a description of the system and methods of the disclosure. Since many examples can be made without departing from the spirit and scope of the system and method of the disclosure, this specification merely sets forth some of the many possible example configurations and implementations.

What is claimed is:

1. An image forming device, comprising: a humidity indicator located under a scan bezel of a scanner;
   a temperature indicator located under the scan bezel of the scanner;
   the scanner to optically scan the humidity indicator and the temperature indicator; a processor; and
   a non-transitory computer readable medium storing computer-executable instructions that when executed by the processor cause the processor to:
   instruct the scanner to initiate a first optical scan of the humidity indicator and the temperature indicator prior to performing a print operation of the image forming device;
   determine a humidity level and a temperature based on the first optical scan of the humidity indicator and the temperature indicator respectively: mttl
   instruct the image forming device to adapt a behavior characteristic of the image forming device responsive of the humidity level and the temperature;
   instruct the scanner to initiate a second optical scan of the humidity indicator and the temperature indicator during a wake-up mode of the image forming device;
   determine a change in the humidity level and temperature between the first optical scan and the second optical scan; and
   instruct the image forming device to change the behavior characteristics of the image forming device only responsive to the change in the humidity level and the temperature exceeding a threshold amount,
   wherein the behavior characteristic is one of a print media pick speed, a print media feed speed, a frequency of printhead servicing, a print media ejection characteristic, or a combination thereof.

2. The image forming device of claim 1, wherein the humidity indicator detects and displays the humidity level responsive to chemically reacting to moisture in an environment.

3. The image forming device of claim 1, wherein the humidity indicator includes a minimum of two humidity levels.

4. The image forming device of claim 1, wherein the processor is to determine the humidity level based on a color interpolation of the humidity indicator.

5. The image forming device of claim 1, further comprising a temperature indicator to detect and display a temperature level.

6. A method, comprising:
   scanning, optically by a scanner of an image forming device, a humidity indicator chemically reactive to moisture in an environment, wherein the humidity indicator is located under a scan bezel of the scanner;
   determining a humidity level based on a scan of a chemical reaction of the humidity indicator;
   scanning, optically by the scanner of the image forming device, a temperature indicator chemically reactive to temperature in an environment, wherein the temperature indicator is located under the scan bezel of the scanner;

determining a temperature level based on a scan of a chemical reaction of the temperature indicator;

selecting, responsive to the humidity level and the temperature level, a setting for a behavior characteristic of the image forming device;

rescanning, optically by the scanner of the image forming device, the humidity indicator and the temperature indicator during a wake-up mode of the image forming device;

determining a change in the humidity level and temperature level between the scan and the rescan;

changing the behavior characteristic of the image forming device only responsive to the change in the humidity level and the temperature level exceeding a threshold temperature and threshold humidity; and performing a print operation of the image forming device utilizing the setting for the behavior characteristic, wherein the behavior characteristic is one of a print media pick speed, a print media feed speed, a frequency of printhead servicing, a print media ejection characteristic, or a combination thereof.

7. A non-transitory machine-readable storage medium storing computer-executable instructions that when executed by a processor cause the processor to:

instruct a scanner to initiate a first scan of a humidity indicator chemically reactive to moisture in an environment and a temperature indicator chemically reactive to temperature, the first scan being an optical scan of the humidity indicator located under a scan bezel of the scanner and the temperature indicator located under the scan bezel of the scanner;

determine a first color interpolation of the humidity indicator and the temperature indicator based on the first scan;

determine a first humidity level based on the first color interpolation of the humidity indicator and a first temperature level based on the first color interpolation of the temperature indicator;

select, based on a combination of the first humidity level and the first temperature level, a plurality of settings corresponding to a plurality of behavior characteristics of an image forming device; and instruct the image forming device to perform a print operation of the image forming device utilizing the plurality of settings for the corresponding plurality of behavior characteristics;

instruct the scanner to initiate a second scan of the humidity indicator and the temperature indicator during a wake-up mode of the image forming device;

determine a second color interpolation of the humidity indicator and the temperature indicator based on the second scan, the second scan being an optical scan of the humidity indicator and the temperature indicator located under the scan bezel of the scanner;

determine a second humidity level based on the second color interpolation of the humidity indicator and a second temperature level based on the second color interpolation of the temperature indicator;

compare a first combination of the first humidity level and the first temperature level to a second combination of the second humidity level and the second temperature level;

adapt, responsive to a difference between the first combination and the second combination exceeding a threshold amount, a setting of the plurality of settings corresponding to a behavior characteristic of the plurality of behavior characteristics of the image forming device; and instruct the image forming device to perform the print operation of the image forming device utilizing the adapted setting for the behavior characteristic, wherein the behavior characteristic of the plurality of behavior characteristics is one of a print media pick speed, a print media feed speed, a frequency of printhead servicing, a print media ejection characteristic, or a combination thereof.

* * * * *